US011537647B2

(12) United States Patent
Sarkar et al.

(10) Patent No.: US 11,537,647 B2
(45) Date of Patent: Dec. 27, 2022

(54) SYSTEM AND METHOD FOR DECISION DRIVEN HYBRID TEXT CLUSTERING

(71) Applicant: Larsen & Toubro Infotech Ltd, Mumbai (IN)

(72) Inventors: Jnanendra Prasad Sarkar, Pune (IN); Sachin Vyas, Pune (IN); Satish Saluja, Pune (IN); Yash Kamat, Mumbai (IN)

(73) Assignee: Larsen & Toubro Infotech Ltd, Mumbai (IN)

( * ) Notice: Subject to any disclaimer, the term of this patent is extended or adjusted under 35 U.S.C. 154(b) by 33 days.

(21) Appl. No.: 17/214,681

(22) Filed: Mar. 26, 2021

(65) Prior Publication Data
US 2022/0129493 A1 Apr. 28, 2022

(51) Int. Cl.
*G06F 16/35* (2019.01)
*G06N 7/00* (2006.01)
*G06F 40/30* (2020.01)

(52) U.S. Cl.
CPC ............ *G06F 16/35* (2019.01); *G06N 7/005* (2013.01)

(58) Field of Classification Search
CPC .......... G06F 16/35; G06F 40/30; G06N 7/005
See application file for complete search history.

(56) References Cited

U.S. PATENT DOCUMENTS

| 9,645,999 B1* | 5/2017 | Ciulla .................. G06F 16/9024 |
| 9,740,368 B1* | 8/2017 | Love .................... G06F 3/04817 |
| 2006/0136410 A1* | 6/2006 | Gaussier ................ G06K 9/623 |
| | | 707/999.005 |
| 2017/0199942 A1* | 7/2017 | Ruffenach ........... G06F 3/04842 |

* cited by examiner

Primary Examiner — Kuen S Lu
(74) Attorney, Agent, or Firm — Mark Farrell; Farrell Patent Law PC

(57) ABSTRACT

The present invention discloses a method and a system for clustering of short and long text documents. The documents are input through an input module and a pre-processing module overtakes the documents from the input module. The pre-processing module refines the documents and removes unwanted text from the documents. Then a decision driven hybrid text clustering algorithm is applied via different modules to achieve clustering of the documents. Firstly, a context module computes a moment value of a feature signifying at least one feature importance value of the feature for the documents. The moment value is used by a decision module to calculate a decision score. Based on the decision score the documents are split into two sets. A clustering module then forms clusters of the two sets of documents based on n-tuple word distribution. Finally, a convergence module congregates the clusters in a final set of documents.

8 Claims, 9 Drawing Sheets

SYSTEM AND METHOD FOR DECISION DRIVEN HYBRID TEXT CLUSTERING

TECHNICAL FIELD OF THE DISCLOSURE

The present disclosure relates generally to clustering of text documents, and more particularly, but not exclusively to a method and a system for grouping a set of specific language documents with respect to content category and when it is unknown whether document is short or long. The method and its related system may provide for an effective way to attribute for identifying a document if it is short or long document and clustering the set of mixed documents into groups based on homogeneity of the content category.

BACKGROUND

Normally, organization uses combination of machine learning, artificial intelligence and optical character recognition automated software solutions to extract insights from a plurality of documents for critical operations and analysis. Moreover, in recent era, a large amount of data is generated on daily basis, where, most of the cases, data is unlabeled and there is no representation with respect to the data. This makes data heterogeneous in nature. Therefore, preprocessing in order to organize documents for maximum extraction becomes critical and eventually decides the quality of the analysis of these documents. To start with, these documents firstly, must be segregated based on their content structure. However, segregating heterogeneous unlabeled data into unique group is a challenging task. Additionally, mix of short and long text documents having no prior information about which is short or long adds more complexities in clustering task.

In order to achieve clustering, many clustering algorithms including K-Means, Fuzzy C-Means, Topic modeling etc. have been proposed in recent decades. However, those algorithms have certain limitation to handle real life text clustering. Both K-Means and Fuzzy C-Means cannot be used directly in text clustering as those are well suited for numerical and structured dataset. On the other hand, topic modeling algorithms produce misleading results while data is non-linear in nature and mostly these need long text documents. Recently certain topic modeling algorithms have been proposed for short text document clustering, but those fail to handle long text documents. Some of the recent researches suggest categorization of the documents based on a feature set of words and then creating a feature vector for it, and eventually a correlation coefficient clustering of documents is performed.

A Non-Patent Literature: Towards Reliable Clustering of English Text Documents using Correlation Coefficient (Co-efficient Clustering) discloses an unsupervised approach to cluster documents in given sets. Inside each document words are weighted, and based on weights given to words selection of features is performed. A correlation coefficient is then calculated for each pair of feature vector. Further, the correlation coefficient is used to cluster the documents.

Further, a US patent application US20160314184A1 describes classification of documents. The classification of documents is based on multiple factors. One of the factors correspond to incoming classification probabilities. A classification engine is applied to create a graph of template nodes, where template nodes are representation of documents. Classification distributions of nodes/templates may be used to calculate classification distributions for other nodes/templates. Also, the prior art discloses clustering based on phrases, ngrams and ngrams plus frequencies.

Further, a non-patent literature "Text Classification Algorithms" discloses certain text classification algorithms. The prior art discloses context-based understanding of words in a document. Also, the prior art discloses models wherein words are converted to vectors and then machine learning techniques are implemented. Further, clustering is also disclosed with respect to labels.

Further, U.S. Pat. No. 10,565,520B2 discloses analyzing documents relating them to certain contexts. Multiple contexts are disclosed in the prior art. However, the prior art does not disclose core determination and probability calculation for clustering of documents.

Similarly, few recent techniques are found for automatically clustering text documents to extract information for analysis. In this regard, comparison technique compares documents to a repository in order to cluster documents. Another technique discusses classification probabilities where documents are represented by a graph of template nodes. Moreover, few more techniques are found where documents are clustered simply by using number of contextual words. However, all these algorithms fail to tackle real life text documents where data are mixed with short and long texts and there is no solution providing for feature determination based on context patterns.

Therefore, there arises a need for a Decision Driven Hybrid Text Clustering (DDHTC) method, where a decision score is computed using allocating weights to n-tuple words based on context to intelligently and automatically decide about the nature of the text, whether it is long or a short text. Thus, based on decision score of the document the entire set of mixed text documents is split into two sets. Subsequently, the two sets of documents are further grouped separately according to the homogeneity in content. Finally, two sets of clusters are converged to produce a final set of clusters. This solution is not provided in any of the algorithms proposed in recent past. Hence, the invented solution offers a more efficient clustering of different types of text documents.

SUMMARY

One or more shortcomings of prior art are overcome, and additional advantages are provided through present disclosure. Additional features are realized through techniques of the present disclosure. Other embodiments and aspects of the disclosure are described in detail herein and are considered a part of the present disclosure.

In one aspect of the disclosure, a method for clustering set of mix documents which are short and long in nature is disclosed, wherein a moment value of a feature signifying feature importance in a document is computed. The moment value is used to compute a statistical coefficient index and a decision score for the one or more documents. The method further includes sorting the one or more documents based on the decision score. Further, clustering of the one or more documents is done by estimating cluster n-tuple word distribution, cluster document distribution and formulated conditional probability equation. In the end, by deriving one or more numerical feature sets for semantic similarities, the one or more clustered documents are converged to produce a final set of documents. The moment value is based on a context pattern in at least one document included in the one or more set of documents. A statistical coefficient index is computed for the at least one document with respect to the moment value. The one or more documents are sorted into a first set C0 and a second set C1 by changing value of n, wherein n=1 for the first set C0 and n=2 for the second set C1.

In another aspect of the disclosure, a system for clustering one or more set of documents is disclosed, wherein the system comprises of a data input module for providing the one or more set of documents. The documents are then passed through a data pre-processing module where unwanted content is removed. Further, a context module computes a moment value of a feature signifying at least one feature importance value of the feature for the one or more documents in the set. A decision module then receives from the context module the moment value for computing a decision score for the one or more documents in the set. A sorting module then sorts the one or more documents in the set based on the decision score. Further, a clustering module combining the one or more documents in the set by computing/estimating cluster n-tuple word distribution, cluster document distribution and conditional probability equation for the one or more documents using a formulated probability equation, is disclosed. Finally, a convergence module for congregating the one or more clustered documents by deriving one or more numerical feature sets for semantic similarities is disclosed, thus producing a final set of documents.

Foregoing summary is illustrative only and is not intended to be in any way limiting. In addition to illustrative aspects, embodiments, and features described above, further aspects, embodiments, and features will become apparent by reference to drawings and following detailed description.

DETAILED DESCRIPTION

Figure 1:
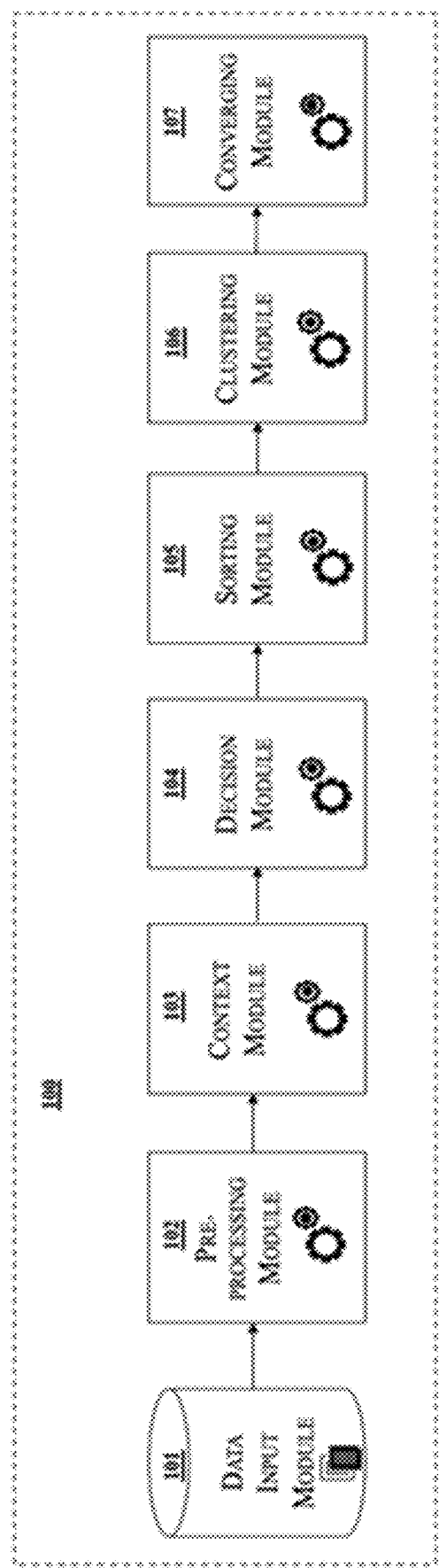
FIG. 1 is a diagram representing a system for clustering of text documents.

In following detailed description of embodiments of present disclosure, numerous specific details are set forth in order to provide a thorough understanding of the embodiments of the disclosure. However, it will be obvious to one skilled in art that the embodiments of the disclosure may be practiced without these specific details. In other instances, well known methods, procedures, components, and circuits have not been described in detail so as not to unnecessarily obscure aspects of the embodiments of the disclosure.

References in the present disclosure to "one embodiment" or "an embodiment" mean that a feature, structure, characteristic, or function described in connection with the embodiment is included in at least one embodiment of the disclosure. Appearances of phrase "in one embodiment" in various places in the present disclosure are not necessarily all referring to same embodiment.

In the present disclosure, word "exemplary" is used herein to mean "serving as an example, instance, or illustration." Any embodiment or implementation of present subject matter described herein as "exemplary" is not necessarily to be construed as preferred or advantageous over other embodiments.

The present disclosure may take form of a hardware embodiment, a software embodiment, or an embodiment combining software and hardware aspects that may all generally be referred to herein as a 'system' or a 'module'. Further, the present disclosure may take form of a computer program product embodied in a storage device having computer readable program code embodied in a medium.

While the disclosure is susceptible to various modifications and alternative forms, specific embodiment thereof has been shown by way of example in drawings and will be described in detail below. It should be understood, however that it is not intended to limit the disclosure to the forms disclosed, but on contrary, the disclosure is to cover all modifications, equivalents, and alternative falling within scope of the disclosure.

Terms such as "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude existence of other elements or additional elements in the system or apparatus.

In following detailed description of the embodiments of the disclosure, reference is made to drawings that form a part hereof, and in which are shown by way of illustration specific embodiments in which the disclosure may be practiced. These embodiments are described in enough detail to enable those skilled in the art to practice the disclosure, and it is to be understood that other embodiments may be utilized and that changes may be made without departing from the scope of the present disclosure. The following description is, therefore, not to be taken in a limiting sense.

In recent era, generation of data in different form including texts has grown almost exponentially. Therefore, extracting information from huge amount of data is very important for any organization. In this regard, grouping of information based on content is a critical part. The present invention discloses a text clustering method for short and long text documents. The method introduces a decision score, which is computed by estimating values of features based on context patterns and statistical coefficient involving features in order to intelligently split set of documents into long and short document sets. Subsequently, two sets are clustered separately considering relative probability of configurable n-tuple words of each document, where strategy of computing probability and selection of n-tuple words is different in the two sets. Finally, the two sets of clusters are converged to produce a final set.

FIG. 1 explains a decision driven hybrid text clustering (DDHTC) system 100. A data input module 101 receives a set of text documents. The documents include both short documents and long documents and the system 100 may decide for the short documents and the long documents. The documents are then passed onto a pre-processing module 102. The pre-processing module performs refining operations on the documents and the documents are made ready for clustering. The refined documents are then passed onto a context module 103. The context module 103 computes a moment value of a feature signifying at least one feature importance value of the feature for the documents in the set. Further, a decision module 104 receives the moment value from the context module 103 and computes a decision score. A sorting module 105 receives the decision score and sorts the set of one or more documents based on the decision score. A clustering module 106 forms clusters of the documents by computing/estimating cluster n-tuple word distribution, cluster document distribution and conditional probability equation. A convergence module 107 congregates the clusters by deriving one or more numerical feature sets for semantic similarities, thus producing a final set of documents.

Figure 2:
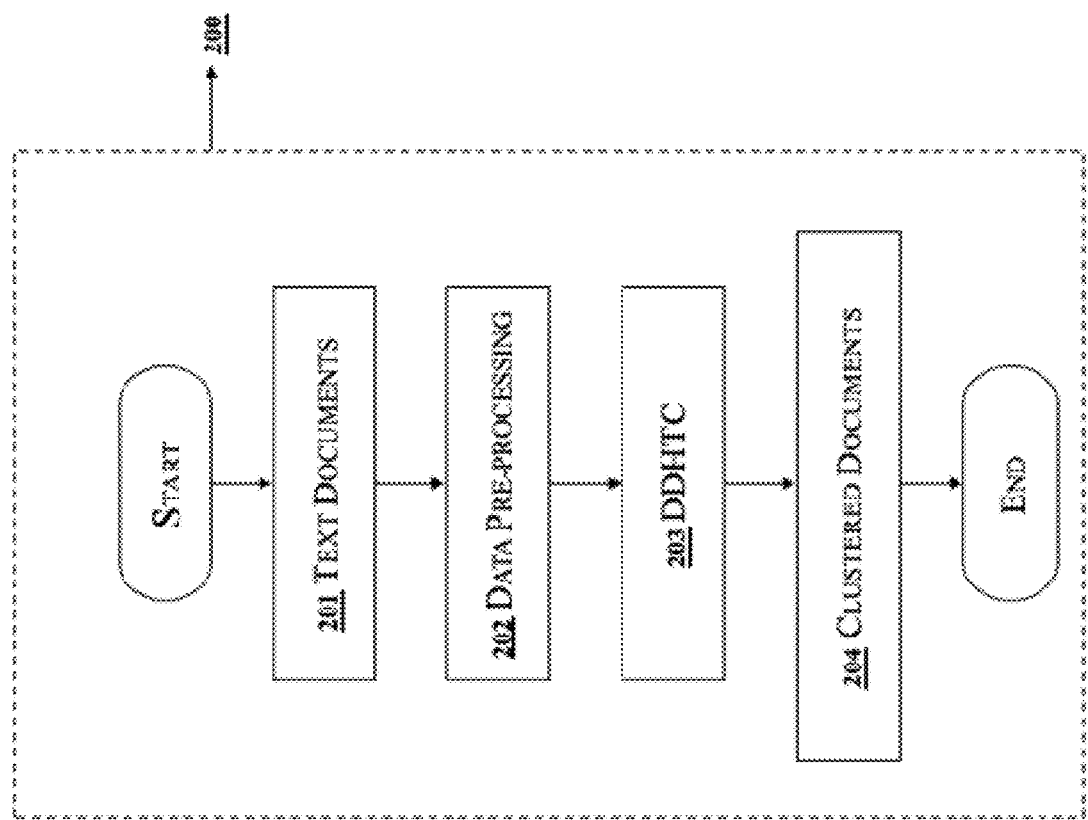
FIG. 2 is a flowchart representing a method for clustering of text documents.

FIG. 2 explains a basic process of clustering of the text documents 200. The text documents 201 are provided as an input. Then data pre-processing 202 is applied on the documents. Further, DDHTC algorithm 203 is applied on the documents. The DDHTC algorithm 203 is further explained in detail, in the later section of the disclosure. In the end, clustered documents 204 are received.

Figure 3:
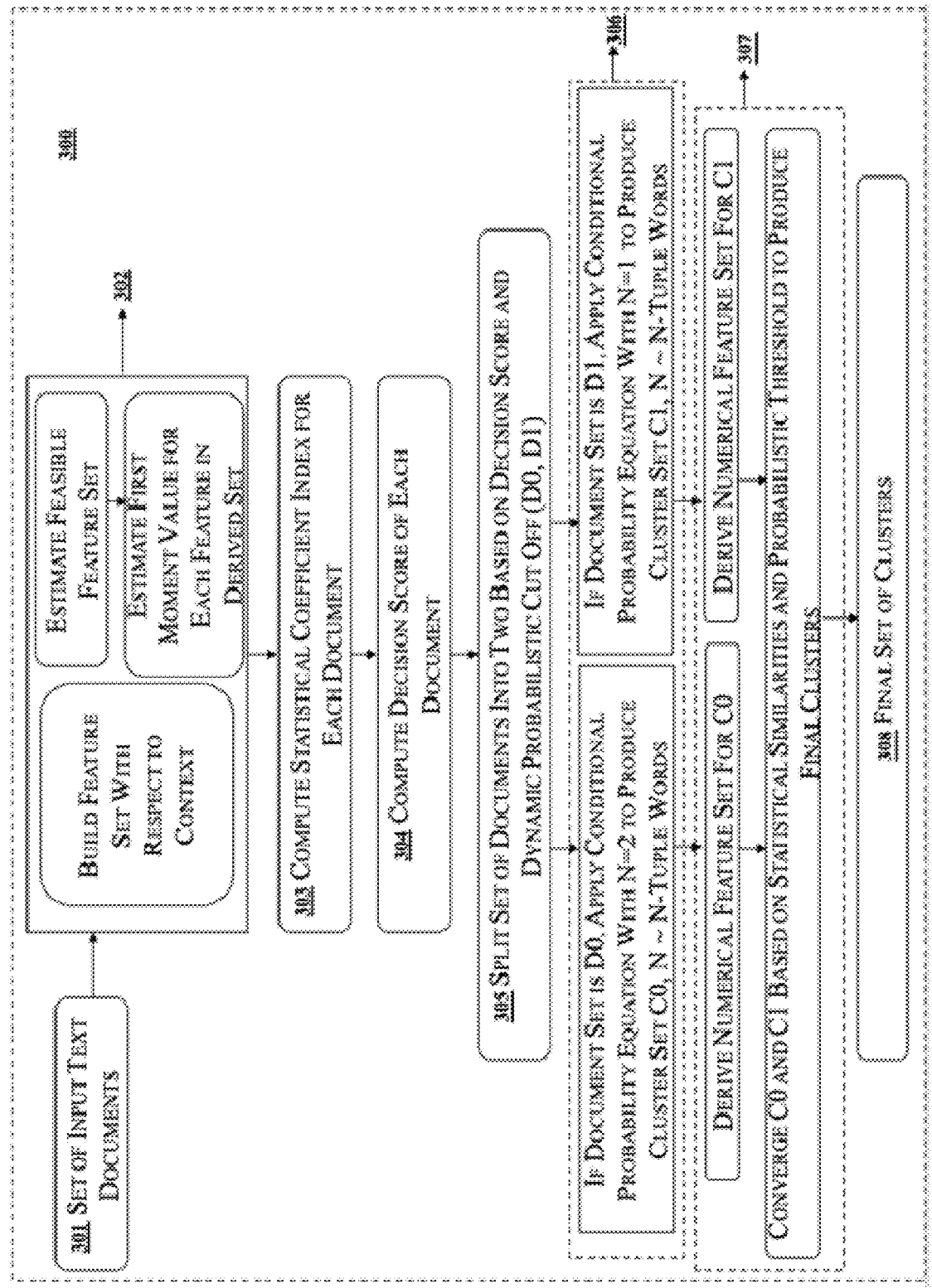
FIG. 3 is a schematic flow diagram representing decision driven hybrid text clustering (DDHTC) algorithm.

FIG. 3 explains a detailed method of clustering of the set of text documents 300. A set of input documents 301 are received. The documents are then forwarded to a moment value calculation process 302, where a feature set is built with respect to context. Further, a feasible feature set is estimated, and a moment value is estimated for each feature in the set. Further, a statistical coefficient index for each document is computed at step 303. At step 304, a decision score is computed for each document. At step 305, the set of documents is split based on the decision score and a dynamic probabilistic cut off. The documents are split into DO (short documents) and D1 (long documents). At step 306, clustering of the set of documents is performed by applying a conditional probability equation. For the DO by considering n=2, cluster set CO is produced. And for the D1 by considering n=1, cluster set Cl is produced. Here n is sequence of n-tuple words of the text document. At step 307, by deriving numerical feature set for the CO and the Cl and considering statistical similarities and probabilistic threshold, a final set of clusters is produced at 308.

In an embodiment, the feature set is built to primarily identify nature of the text. A moment value (extracted from a p-tuple word in this case) has been introduced to signify the importance of the feature. The moment value of feature is computed based on occurrence of the feature in the document and the conditional probability of occurrence of that feature in that document given the length of the document is less or greater than an experimentally configurable value. The feature can be either discrete or random or continuous, or the like.

In another embodiment, the p-tuple words after data preprocessing is considered as features and the feature set contains maximum number of such p-tuple words. Therefore, here the type of feature is discrete. The moment value of the feature is computed by multiplying occurrence of the feature in the document with the conditional probability of occurrence of that feature in that document given length of the document is less or more than an experimentally configurable value. The configurable value is considered as a hyperparameter and it can be tuned based on different use cases. Default value of this parameter is experimentally set as '20'.

The moment value of each feature is used to compute a statistical coefficient index of an individual document. In this regard, a set of importance weightage of each feature is considered. The set of importance weightage is kept generic. It can be manually or experimentally configured. It can also be derived based on a domain importance rank of each feature by considering them as a key word with respect to a domain. The key word can be computed using a TF-IDF method or any such similar method. The statistical coefficient index of the document is computed as sum of product of each feature moment value and its importance weightage. Thus, each document will be associated with the statistical coefficient index.

The decision score of each document is computed as a sigmoid value of the statistical coefficient index of each document. Thus, value of decision score ranges between 0 and 1. To discretize the value of decision score, an experimentally established threshold value is considered. We call the discretized value of decision score as discrete decision score. The discrete decision score is 0 if the value of decision score is less or equal to the threshold value, else it is 1. Therefore, the discrete decision score logically splits the text document set into two. All the documents having discrete decision score as 0 belong to first group denoted by D0 (short documents) and rest in second group denoted by D1 (long documents). The first group is considered as set of short text documents and the second group is considered as set of long text documents.

After having two different groups of documents, clustering is performed in each of the groups separately. In order to cluster each group, cluster n-tuple word distribution and cluster document distribution are estimated using sequence of n-tuple words of the text document. In case of D0, the value of n=1 whereas for D1, the value of n=2. Subsequently, the conditional probability is formulated to determine belongingness of a document into a cluster. The cluster n-tuple word distribution, the cluster document distribution and the formulated conditional probability are computed in multiple iterations until an optimized number of clusters is found. The optimized number of clusters are determined by computing a metric, Coherence score. The coherence score is a metric introduced by M. Roder in 2015, which measures how well semantic similar type of keywords are grouped into a single cluster. Higher the Coherence score, better are the clusters formed. Thus, D0 are grouped into optimized clustered denoted by C0 and D1 is grouped into clustered denoted as C1.

For the set D0:

$P(\text{clusters} | D0) =$ $P(\text{clusters} | n \text{ tuple words}, n = 2) * P(n \text{ tuple words}, n = 2 | D0)$ Produce cluster set C0

For the set D1:

$P(\text{clusters} | D1) =$ $P(\text{clusters} | n \text{ tuple words}, n = 1) * P(n \text{ tuple words}, n = 1 | D1)$ Produce cluster set C1

Further, C0 and C1 are converged into a final optimized set of clusters. In this regard, using count vectorization method, numerical feature vectors corresponding to each cluster of C0 and C1 are computed separately. Thus, there are two feature vector sets—one is for C0 and another is for C1. Thereafter, each pair of feature sets are considered to compute a semantic similarity score. If the semantic similarity score is higher than an experimentally set threshold value, then corresponding two clusters of two groups are merged into one. Otherwise, they will be considered into two separate clusters in the final cluster set.

Figure 4:
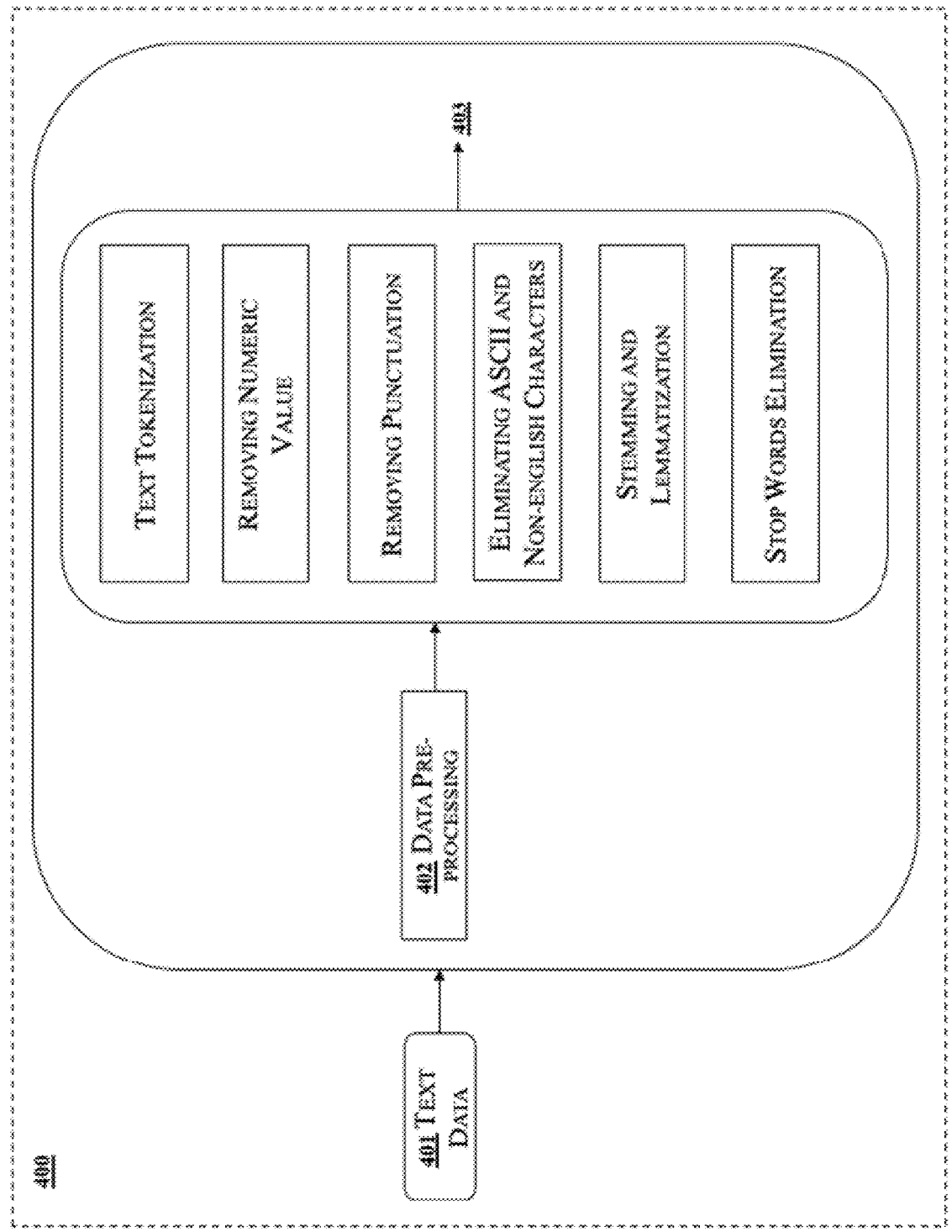
FIG. 4 is a schematic flow diagram representing data pre-processing module.

FIG. 4 explains pre-processing of data 400. At step 401, text data is received. At step 402, data pre-processing is initiated. At step 403, each text document is split into text tokens to convert the text document in a set of text tokens. Any isolated numeric values are removed from the text document. Further, punctuation, ASCII or non-English characters are also removed from the text document. The document is normalized by performing standard stemming and lemmatization operations. Finally, standard stop words are removed to get rid of any ambiguity within texts. Along with standard stop words, domain specific stop words are also configured as a list.

Figure 5:
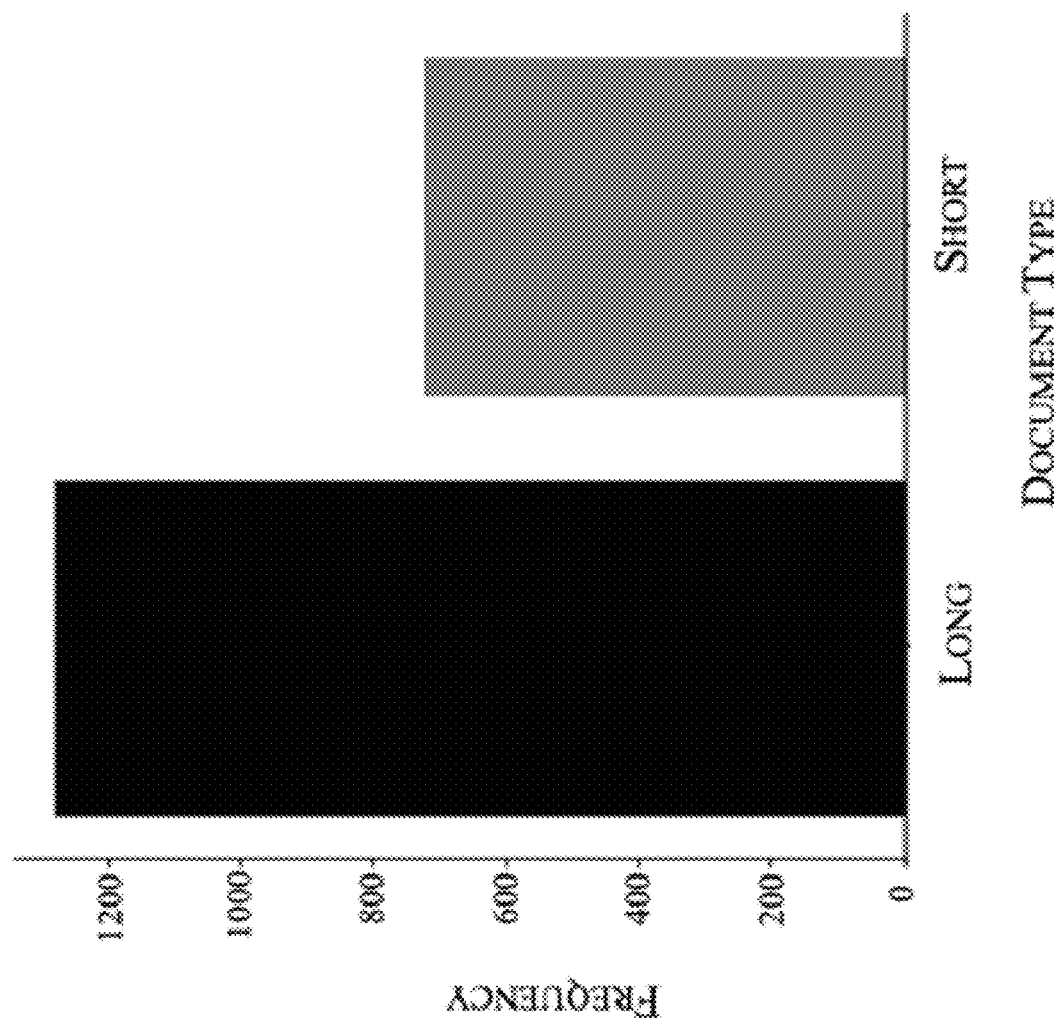
FIG. 5 represents distribution of number of short and long documents as per true information.

In another embodiment, the current invention has been applied on a dataset of 2000 documents which are mixed of short and long in nature. The documents are tagged as short, long and labeled for cluster in advance to compare results produced. FIG. 5 shows distribution of number of short and long documents as per true information.

Figure 6:
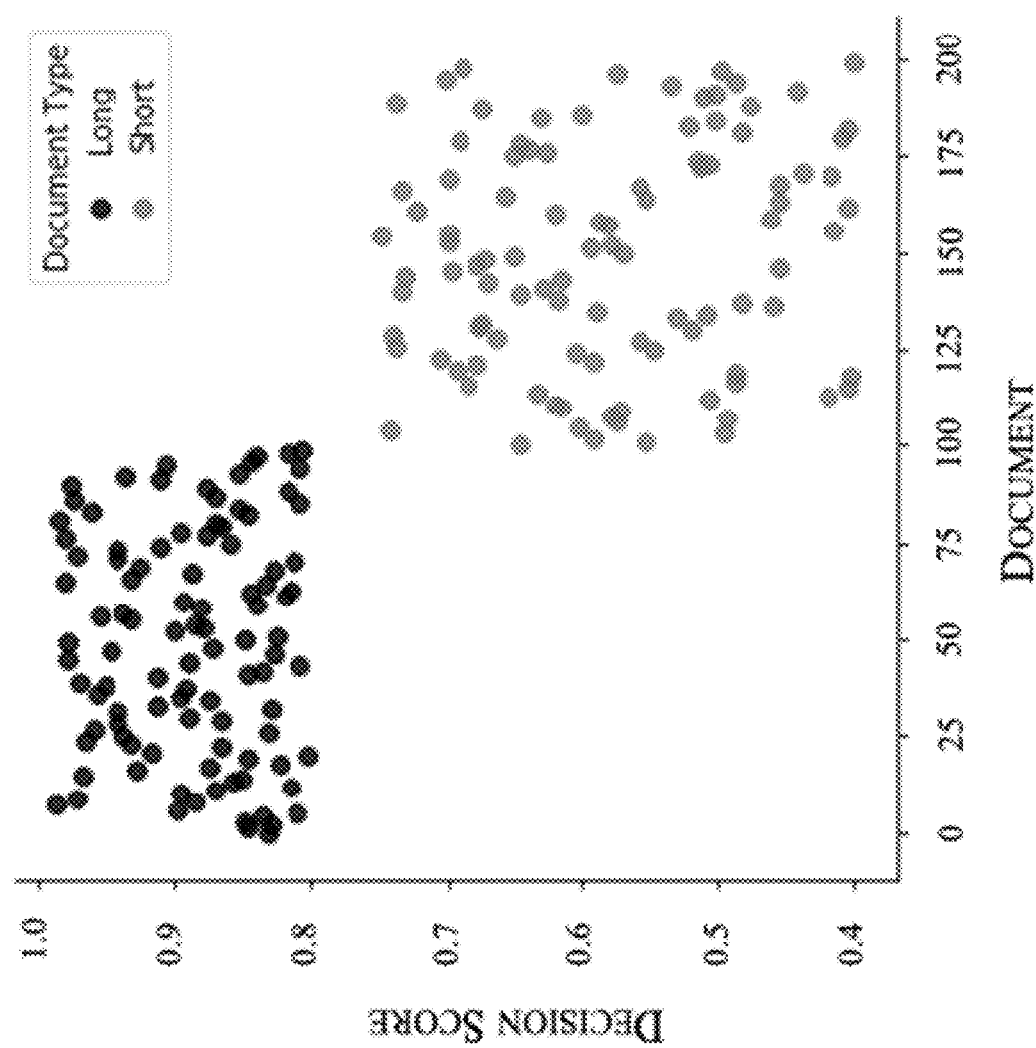
FIG. 6 represents separated 200 random documents.

After the data pre-processing the decision score is computed and based on experimentally set threshold value 0.8, the documents have been successfully separated. For illustration purpose, the FIG. 6 has been shown for 200 random documents. X-Axis signifies document number, whereas Y-Axis denotes the decision score. Moreover, grey and black color scattered points represent short and long type of documents respectively.

Figure 7:
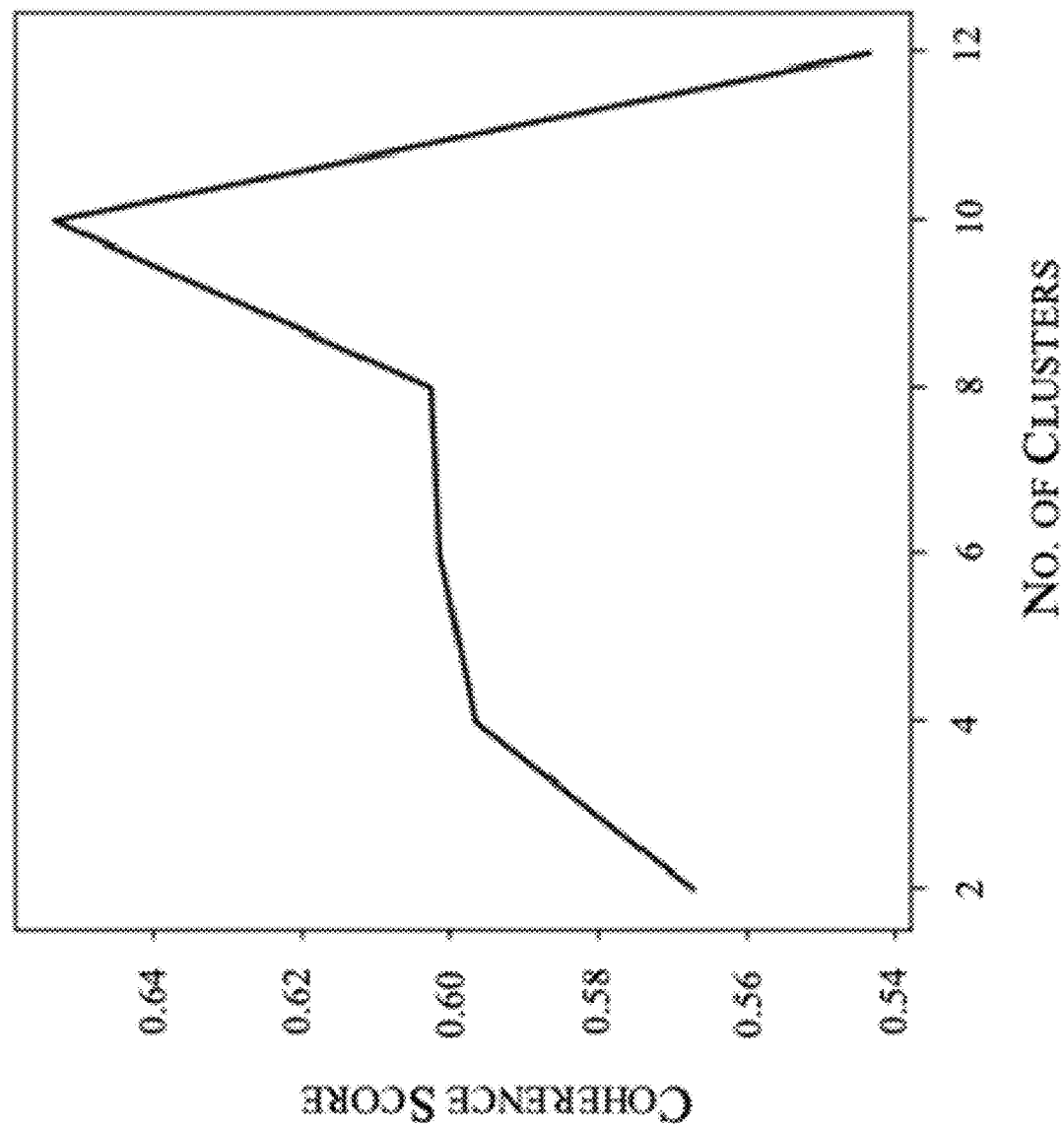
FIG. 7 represents optimized clusters for long document groups.
Figure 8:
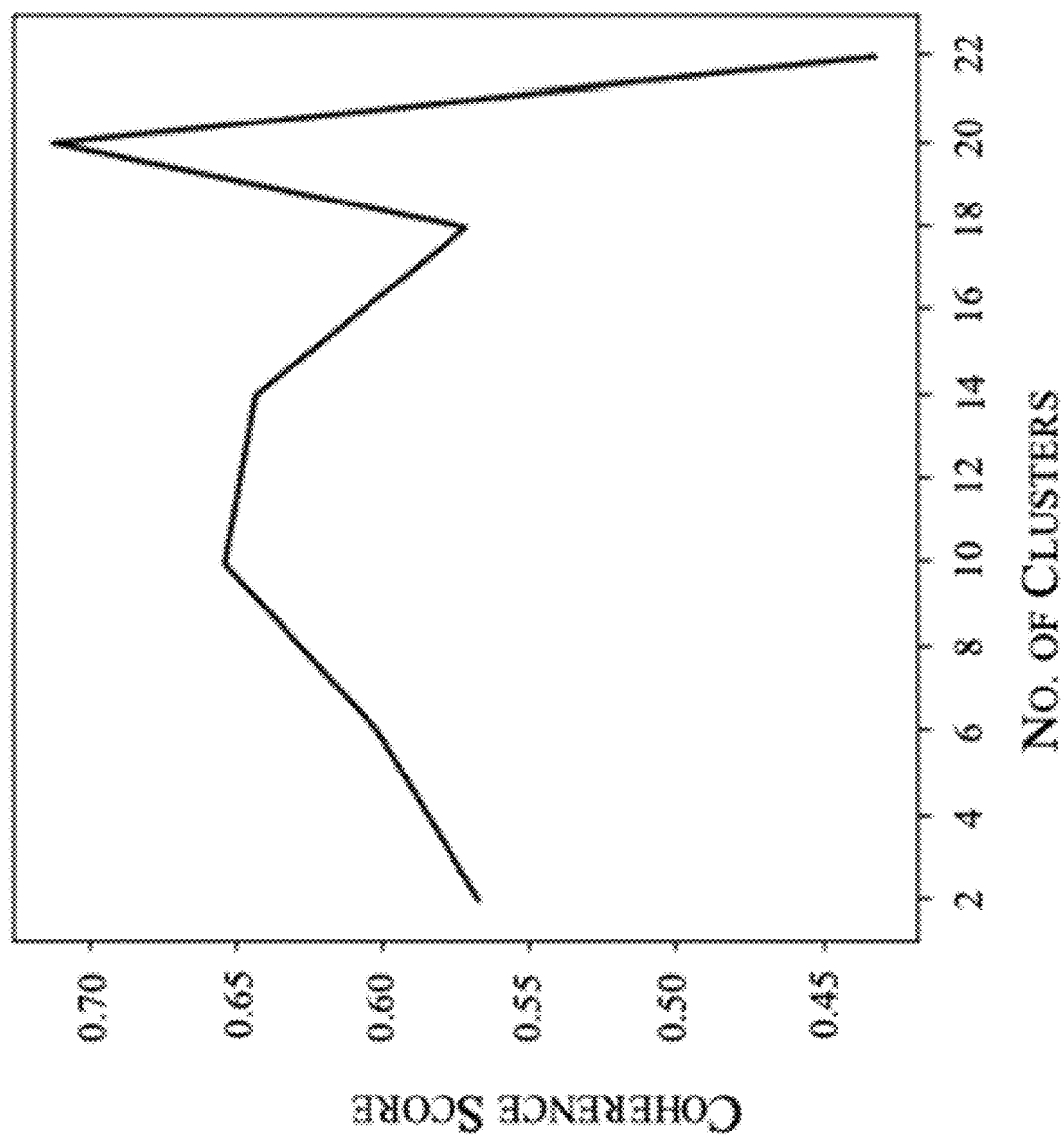
FIG. 8 represents optimized clusters for short document groups.
Figure 9:
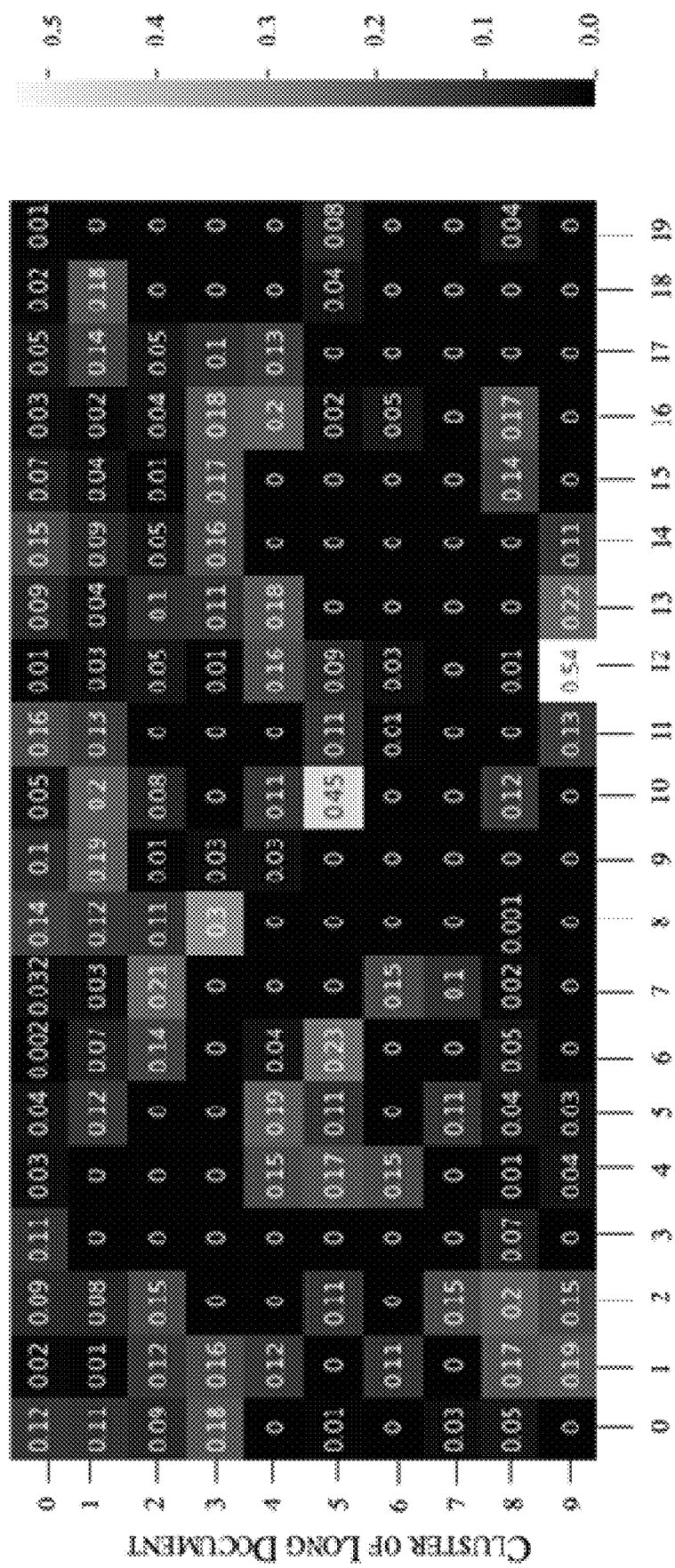
FIG. 9 represents semantic similarity score of feature set between each pair between two groups of clusters.

Thereafter, each group of documents are clustered separately. For long document groups 10 optimized clusters are obtained based on Coherence score. From FIG. 7, it is evident that coherence score is high for 10 number of clusters. Similarly, FIG. 8 shows that 20 optimized number of clusters are estimated for short document groups as coherence score is higher. In final step, 10 clusters in long text group and 20 clusters in short text group are converged into 27 clusters based on the semantic similarity score of feature set between each pair between these two groups of clusters. FIG. 9 reports the semantic similarity score of feature set between each pair between two groups of clusters, where counting of cluster number starts with 0. Experimentally the threshold value has been configured as 0.25. It can be observed from FIG. 9 that cluster 9 of long text group and cluster 12 of short text group has semantic similarity score equal to 0.54 which is greater than the threshold value signifying that these two clusters are similar in nature. Therefore, these two clusters are merged into one cluster. Similarly, cluster 5 & cluster 10 and cluster 3 & cluster 8 of long text group and short text group are merged respectively due to having the similarity score greater than the threshold value. Finally, 27 optimized clusters are produced.

In the present implementation, the system 100 includes one or more processors. The processor may be implemented as one or more microprocessors, microcomputers, microcontrollers, digital signal processors, central processing units, state machines, logic circuitries, and/or any devices that manipulate signals based on operational instructions. Among other capabilities, the at least one processor is configured to fetch and execute computer-readable instructions stored in the memory. The system further includes I/O interfaces, memory and modules.

The I/O interfaces may include a variety of software and hardware interfaces, for example, a web interface, a graphical user interface, and the like. The I/O interface may allow the system to interact with a user directly or through user devices. Further, the I/O interface may enable the system (100) to communicate with other user devices or computing devices, such as web servers. The I/O interface can facilitate multiple communications within a wide variety of networks and protocol types, including wired networks, for example, LAN, cable, etc., and wireless networks, such as WLAN, cellular, or satellite. The I/O interface may include one or more ports for connecting number of devices to one another or to another server.

The memory may be coupled to the processor. The memory can include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Further, the system (100) includes modules. The modules include routines, programs, objects, components, data structures, etc., which perform tasks or implement particular abstract data types. In one implementation, module includes a display module and other modules. The other modules may include programs or coded instructions that supplement applications and functions of the system (100).

As described above, the modules, amongst other things, include routines, programs, objects, components, and data structures, which perform particular tasks or implement particular abstract data types. The modules may also be implemented as, signal processor(s), state machine(s), logic circuitries, and/or any other device or component that manipulate signals based on operational instructions. Further, the modules can be implemented by one or more hardware components, by computer-readable instructions executed by a processing unit, or by a combination thereof.

Furthermore, one or more computer-readable storage media may be utilized in implementing some of the embodiments consistent with the present disclosure. A computer-readable storage medium refers to any type of physical memory on which information or data readable by a processor may be stored. Thus, the computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

We claim:

1. A method, comprising:
   receiving a plurality of text documents in a memory of a device comprising one or more processors;
   at the one or more processors:
   selecting a set of features in the plurality of text documents to represent a nature of the contents of the plurality of documents, each feature comprising an n-tuple ordered list of n elements in at least one of the text documents indicative of the nature of the contents of the plurality of text documents;
   assigning a respective weight to each feature in the set of features;
   computing a moment of each feature in the set of features, each moment based on a frequency of occurrence of the feature in the plurality of text documents and a probability of occurrence of each feature in each text document with respect to a length of the text document;

computing a statistical coefficient index for each text document of the plurality of text documents, each statistical coefficient index for a text document obtained by:
   computing, for each feature in the text document, a product comprising the moment of the feature times the respective weight assigned to the feature, and
   computing a sum of each product corresponding to each feature in the text document to obtain the statistical coefficient index for the text document;

computing a decision score for each text document of the plurality of text documents, each decision score comprising a sigmoid value of the statistical coefficient index of the text document, each sigmoid value in a range of 0 to 1;

selecting a first threshold value between 0 and 1;

splitting the plurality of text documents into a first group comprising text documents with a decision score less than or equal to the first threshold value and a second group comprising text documents with a decision score greater than the first threshold value;

iteratively applying a clustering process to the text documents in the first group based on a distribution of the n-tuple features and the probability of occurrence of the n-tuple features in the text documents of the first group, wherein n=1, to determine an optimized number of clusters for the text documents in the first group and to assign the text documents in the first group to a given cluster of the first group based on a coherence score of semantically similar features in the text documents of the given cluster;

iteratively applying the clustering process to the text documents in the second group based on a distribution of the n-tuple features and the probability of occurrence of the n-tuple features in the text documents of the second group, wherein n=2, to determine an optimized number of clusters for the text documents in the second group and to assign the text documents in the second group to a given cluster of the second group based on a coherence score of semantically similar features in the text documents of the given cluster;

applying a count vectorization process to the features of each cluster of the first group to obtain a first set of feature vectors of the clusters of the first group;

applying the count vectorization process to the features of each cluster of the second group to obtain a second set of feature vectors of the clusters of the second group;

computing a semantic similarity score for pairs comprising a cluster of the first group and a cluster of the second group;

merging the cluster of the first group with the cluster from the second group in the pair when the semantic similarity score is higher than a second threshold value to converge the clusters of the first group and the clusters of the second group into a final set of clusters of the plurality of text documents; and storing the final set of clusters of the plurality of text documents on a data storage device or displaying the final set of clusters on a user interface hardware.

2. The method as claimed in claim 1, wherein the moment value is also based on a context pattern in at least one text document included in the plurality of text documents.

3. The method of claim 1, wherein the first threshold value and the second threshold value are experimentally established or manually entered by a user into the device.

4. The method of claim 1, further comprising identifying to the user a relative length of each text document of the plurality of text documents based on the iterative clustering, wherein the relative length comprises a relatively long text document or a relative short text document with respect to other text documents in the plurality of text documents.

5. The method of claim 1, further comprising indicating to the user a degree of homogeneity of contents of a given cluster of text documents of the final set of clusters of the plurality of text documents.

6. The method of claim 1, further comprising preprocessing the plurality of text documents, the preprocessing comprising:
   splitting each text document into text tokens to convert each text document into a set of text tokens.

7. The method of claim 1, further comprising preprocessing the plurality of text documents, the preprocessing comprising:
   removing numeric values from each text document;
   removing punctuation and ASCII characters from each text document;
   normalizing each text document by a stemming operation and a lemmatization operation; and
   removing stop words from each text document.

8. The method of claim 1, further comprising preprocessing the plurality of text documents, the preprocessing comprising removing non-English characters from each text document comprising an English language.

* * * * *